United States Patent Office 2,959,551
Patented Nov. 8, 1960

2,959,551
CARBONATED BASIC BARIUM PHENATE COMPOSITIONS

William M. Le Suer, Cleveland, Ohio, assignor to The Lubrizol Corporation, Wickliffe, Ohio, a corporation of Ohio No Drawing. Filed Mar. 18, 1957, Ser. No. 646,569

9 Claims. (Cl. 252—42.7)

This invention relates to oil-soluble compositions which contain unexpectedly high proportions of metal, yet which are nevertheless quite soluble in hydrocarbon oil solutions. It relates in a more particular sense to such compositions which are characterized by a high barium content.

The utility of oil-soluble compositions which contain large amounts of metal, particularly alkaline earth metal, has become established within recent years. These compositions are useful as additives for crankcase lubricants, plastic compositions, film-forming compositions, and many others. The efficacy of such additives appears to be related directly to the metal content thereof so that it has become important to learn how to prepare such metal-containing compositions more economically, and also to learn how to prepare compositions which contain an even greater proportion of metal.

Many such processes by which these metal-containing compositions may be prepared have been discovered. Almost all of them, and all of the commercially significant of such processes depend upon the use of a highly polar dispersing agent such as a metal sulfonate or metal salt of a phosphorus thioic acid. These highly polar salts appear to act in such a way as to incorporate larger amounts of metal into the ultimate oil-soluble product and also to stabilize the resulting dispersion for long periods of time.

One highly advantageous feature of all processes by which these products may be prepared is that the resulting product is notably inexpensive because of the incorporation into oil-soluble form of relatively large amounts of inexpensive basic inorganic metal compound. Such inorganic compounds are much less expensive than the oil-soluble highly polar metal salts which as indicated above have also been used in the process.

It is a principal object of the present invention to provide a less expensive process by which oil-soluble compositions containing relatively large amounts of barium may be prepared.

A further object of the invention is to provide a process as above which does not require the use of a highly polar oil-soluble metal salt as a reactant. These and other objects of the invention are achieved by a process for the preparation of oil-soluble compositions containing stoichiometrically large amounts of metal which comprises preparing a mixture of (a) An alkyl phenol,
(b) From about 0.1 to about 5.0 equivalents per equivalent of (a) of a nitrated substantially aliphatic hydrocarbon, and
(c) At least two equivalents per equivalent of combined (a) and (b) of a basic barium compound selected from the class consisting of barium oxide and barium hydroxide; and treating the mixture with carbon dioxide to reduce substantially the titratable basicity of said mixture.

The above process requires no unusual operating conditions. The ingredients are mixed, heated, and then treated with carbon dioxide. Ordinarily the product mixture obtained from this process containing a small amount of undissolved material which may be removed conveniently by filtration and centrifuging, although in many cases the amount of this insoluble matter is negligible and its removal may be unnecessary.

The alkyl phenol reactant may be derived from phenol itself, or from naphthol, or from other polynuclear phenolic compounds. It may also be a bis phenol such as is obtained from the condensation of an aldehyde with a phenol. Specific examples of alkyl phenols which are contemplated for use in the process of this invention are butyl phenol, hexyl phenol, heptyl phenol, octyl phenol, dodecyl phenol, octadecyl phenol and higher alkylated phenols; octyl naphthol, dodecyl naphthol and higher alkylated naphthols; a condensation product of formaldehyde and 2 moles of octyl phenol, a condensation product of acetone and 2 moles of heptyl phenol, a condensation product of octyl phenol and 0.4 mole of formaldehyde, etc. The butyl, hexyl, octyl groups recited above may be either the normal, iso, or other branched chain versions of these alkyl groups. Generally, for reasons of availability, they are branched chain alkyl groups.

The substantially aliphatic hydrocarbons of (b) are for the most part either petroleum fractions or polyolefins. Pure aliphatic hydrocarbons such as propane, decane, etc. likewise are contemplated and have been found to be useful in the process. Those petroleum fractions which are less than 10% aromatic are preferred from among the various petroleum fractions available. This percentage figure is based upon the proportion of benzenoid rings present in the over-all petroleum fraction so that "aromatic" refers to benzenoid rings and not to particular compounds which contain one or more benzenoid rings. The process of this invention depends upon the use as a starting material of a nitrated hydrocarbon in which the aliphatic portion of the hydrocarbon has been nitrated and petroleum fractions as described above have been found to yield such nitrated hydrocarbons.

A second large class of aliphatic hydrocarbon starting materials which are available for use in the preparation of the nitrated compounds recited in the process of this invention are polymers of aliphatic olefins. Such polymers include chiefly polyisobutylene, polypropylene, polyethylene and the various copolymers of isobutylene. Such copolymers include those prepared from styrene, butadiene, isoprene, etc. Other polymers obviously will find utility in this process, but those stated have been found to be very useful and are preferred. The preparation of such polymers may be effected according to any of several well-known methods. Thus polyisobutylene may be prepared by polymerization of isobutylene at 0–30° C. with an ionic catalyst such as boron trifluoride or aluminum chloride. Free-radical type catalyst likewise may be used in effecting the polymerization of these monomers. In general the low molecular weight polymers are preferred. Those having molecular weights up to about 5000 are preferred.

Nitration of the above-described substantially aliphatic hydrocarbons may be accomplished by treatment thereof with 70% nitric acid at elevated temperatures. Such methods of nitration are well known in the art and need no further elaboration here. It is sufficient to say that other nitrating agents also may be used, that the temperature of the nitration ordinarily is within the range of 50–200° C., and that auxiliary reactants such as sulfuric acid, glacial acetic acid and phosphorus pentoxide may be used to aid the nitration. It is understood, of course, that the nitration reaction results in the formation of a mixture of products some of which may contain one nitro group, some of which may contain two or more nitro groups, and in some cases the product may contain a large proportion of unreacted hydrocarbon. Such product mixtures may contain also, in addition to aliphatic nitro molecules, nitrate esters, nitrite esters, nitroso compounds, etc. Such mixtures of products are most conveniently referred to for the purposes of this invention as "nitrated substantially aliphatic hydrocarbons" and such terminology is intended to denote the mixture above described which results from the nitration of the substantially aliphatic hydrocarbons also above described.

As indicated previously the process conditions are quite simple. The reactants are mixed, heated briefly to aid thorough mixing and then treated with carbon dioxide until the titratable basicity of the mixture is substantially reduced. The initial period of heating the reactants prior to treatment with carbon dioxide may be dispensed with if desired although generally it is more convenient to apply heat to this mixture inasmuch as the next step of treatment with carbon dioxide requires elevated temperatures. The range of temperatures required for this step of carbon dioxide treatment is from about 75° C. to about 200° C. Higher temperatures may be used, that is the carbonation step may be carried out at temperatures of 250° C. for example, but there is no apparent advantage in the use of such higher temperatures and ordinarily a temperature of 150° C. is entirely satisfactory. If the carbonation is carried out at a temperature less than about 75° C., the resulting product mixture will in many cases be hazy and difficultly filterable.

The step of carbonation has two very noticeable and beneficial effects. It has a clarifying effect on both the process mixture and on the ultimate product, and it allows the incorporation of significantly more barium into the homogeneous organic composition.

The step of carbonation is continued until the titratable basicity of the mixture is substantially reduced. The degree of "titratable boscity," prior to carbonation is determined by the relative proportions of barium oxide and barium hydroxide present in the mass. As the carbonation proceeds this barium oxide or barium hydroxide is neutralized by the carbon dioxide and the titratable basicity is accordingly diminished. For most purposes the products of the process of this invention should have a titratatable basicity of less than 10 as determined by A.S.T.M. method D-974-53T, modified in that the temperature is reduced from 100° C. to room temperature. There are some cases in which a more basic product may be desired and such products may be obtained merely by halting the carbonation at some intermediate point in the reduction of this basic number.

The amount of metal which is found in the oil-soluble product is far more than can be accounted for on a stoichiometric basis. The only oil-solubilizing influences present in the product, with respect to the barium oxide or barium hydroxide, are the alkyl phenol and the nitrated substantially aliphatic hydrocarbon. And in those instances in which the alkyl phenol is such as to give rise to an ordinarily oil-insoluble barium phenate it will be seen that the oil-solubilizing influence of such an alkyl is indeed slight. Nevertheless, for the purpose of providing some estimate of the stoichiometric excess of barium present in the oil-soluble products of this invention the term "metal ratio" is used. This metal ratio denotes the ratio of total equivalents of barium in the oil-soluble product to the total equivalents of combined nitrated hydrocarbon and alkyl phenol also present in this product. A study of the examples which follow shows that such metal ratios range up to as high as 9.0.

Example 1

A polyisobutylene having a molecular weight of 700-800 and prepared by the aluminum chloride-catalyzed polymerization of isobutylene at 0–30° C., was nitrated with a 10% excess (1.1 moles) of 70% aqueous nitric acid at 70–75° C. for 4 hours. The volatile components of the product mixture were removed by heating to 75° C./75 mm. To a mixture of 151 grams (0.19 mole) of this nitrated polyisobutylene, 113 grams (0.6 mole) of heptyl phenol, 155 grams of water and 2057 grams of mineral oil there was added at 70° C. 612 grams (4.0 moles) of barium oxide. This mixture was heated at 150° C. for an hour, then treated with carbon dioxide at this same temperature until the mixture was neutral. The product mixture was filtered and the filtrate found to have the following analyses:

| | |
|---|---|
| Percent sulfate ash | 27.6 |
| Percent N | 0.06 |
| Base No. | 4.0 |
| Metal ratio | 9.0 |

Example 2

A mixture of 584 grams (0.5 mole) of a nitrated polyisobutylene (prepared as indicated in Example 1), 64 grams (0.3 mole) of heptyl phenol, 17 grams of water, 564 grams of mineral oil and 189 grams (1.2 moles) of barium oxide was heated at 120–130° C. for one hour. Carbon dioxide was bubbled into the mixture at 150° C. until the basicity thereof was eliminated. The mixture then was filtered and the filtrate shown to have the following analyses:

| | |
|---|---|
| Percent sulfate ash | 18.1 |
| Percent N | 0.3 |
| Base No. | 2.5 |
| Metal ratio | 2.8 |

Example 3

A solvent-refined Mid-Continent petroleum fraction having a viscosity of 46 SUS (210° F.) was nitrated by treatment with 1.3 mole of 70% aqueous nitric acid at 30–88° C. for 8 hours, and then at 100° C./12 mm. for one hour. This crude product was washed with dilute aqueous sodium bicarbonate solution, then with water, and then was dried at 100° C./12 mm. for an hour. A mixture of 955 grams (1.0 mole) of this nitrated petroleum fraction, 62 grams (0.3 mole) of heptyl phenol, 750 grams of mineral oil, 120 grams of water and 498 grams (3.25 moles) of barium oxide was heated at reflux temperature for one hour. Water was removed by distillation and the temperature raised to 150° C. whereupon carbon dioxide as bubbled through the mixture at this same temperature until the mixture was neutral. Filtration yielded a clear filtrate having the following analyses:

| | |
|---|---|
| Percent sulfate ash | 27.6 |
| Percent N | 0.4 |
| Base No | 5.0 |
| Metal ratio | 4.1 |

Example 4

The polyisobutylene of Example 1 was nitrated by treatment with 3.0 moles of 70% aqueous nitric acid at 95° C. for 14 hours. This crude product was diluted with an equal volume of petroleum ether, washed with aqueous sodium bicarbonate, then water, and then dried by heating at 105° C./30 mm. for one hour. To a mixture of 5400 grams (7.5 moles) of this nitrated polyisobutylene, 1500 ml. of methanol and 3000 ml. of benzene there was added 628 grams (4.1 moles) of barium oxide. This mixture was heated at reflux temperature for 3 hours, then filtered and the filtrate freed of its volatile components by heating to 122° C./10 mm. The residue was a barium salt of the nitrated polyisobutylene.

A mixture of 1461 grams (1.85 moles) of this barium salt, 711 grams (1.75 moles) of a 50% mineral oil solution of an octyl phenol-formaldehyde condensation product (prepared by heating a 1:0.38 molar mixture of these reactants at 90–95° C. for 4 hours in the presence of aqueous ammonium hydroxide as a catalyst, and then removing the aqueous layer), 285 grams of water and 567 grams (3.7 moles) of barium oxide was heated at 100° C. for one hour. Volatile components of the mixture then were removed by distillation and the temperature raised to 150° C. whereupon carbon dioxide was bubbled into the mixture until the mixture was neutral. The product was diluted with 1000 grams of mineral oil and filtered to yield a filtrate with the following analyses:

| | |
|---|---|
| Percent sulfate ash | 25.0 |
| Percent N | 0.5 |
| Base No | 7.0 |
| Metal ratio | 2.8 |

Example 5

A solvent-refined, acid-treated Pennsylvania petroleum fraction was nitrated by treatment with 1.5 moles of 70% aqueous nitric acid at 54–78° C. for 8 hours. After removal of volatile components of the product mixture by heating at 103° C./15 mm. for 2 hours a 787-gram portion (1.0 mole) of the nitrated product was treated with 62 grams (0.3 mole) of heptyl phenol, 495 grams of mineral oil, 90 grams of water and 378 grams (2.5 moles) of barium oxide. This mixture was heated at reflux temperature for an hour, then freed of water by distillation. The temperature was increased to 150° C. whereupon carbon dioxide was bubbled into the mixture until it was neutral. Filtration yielded a clear filtrate with the following analyses:

| | |
|---|---|
| Percent sulfate ash | 27.6 |
| Percent N | 0.5 |
| Base No | 6.0 |
| Metal ratio | 3.1 |

Example 6

A mixture of 611 grams (0.75 mole) of the nitrated polyisobutylene of Example 1, 96 grams (0.45 mole) of heptyl phenol, 2104 grams of mineral oil, 188 grams of water and 736 grams (4.8 moles) of barium oxide was heated at reflux temperature for an hour. The water was distilled away and carbon dioxide passed into the mixture at 150° C. until the mixture was no longer basic. This carbonated mixture was filtered and the clear fluid filtrate showed the following analyses:

| | |
|---|---|
| Percent sulfate ash | 26.3 |
| Percent N | 0.15 |
| Base No | 2.4 |
| Metal ratio | 6.7 |

Example 7

A solvent-extracted, Mid-Continent petroleum fraction having a viscosity of 54 SUS (210° F.) was nitrated as in Example 5. To a mixture of 784 grams (1.0 mole) of this nitrated petroleum fraction there was added 62 grams (0.3 mole) of heptyl phenol, 498 grams of mineral oil, 90 grams of water and 376 grams (2.5 moles) of barium oxide. This mixture was heated at reflux temperature and then, after removal of water by distillation, at 150° C. at which temperature carbon dioxide was bubbled into the mixture until it was neutral. Filtration yielded a filtrate having the following analyses:

| | |
|---|---|
| Percent sulfate ash | 27.0 |
| Percent N | 0.5 |
| Base No | 7.0 |
| Metal ratio | 3.0 |

Example 8

To a mixture of 408 grams (0.5 mole) of a nitrated polyisobutylene prepared as in Example 1, 62 grams (0.3 mole) of heptyl phenol, 712 grams of toluene and 28 grams of water there was added at 70–86° C. 188 grams (1.2 moles) of barium oxide. This mixture was heated at 86° C. while carbon dioxide was passed through until neutrality was achieved. Water and toluene were removed by distillation and the residue was filtered to yield a filtrate having the following analyses:

| | |
|---|---|
| Percent sulfate ash | 22.1 |
| Percent N | 0.5 |
| Base No | 0.0 |
| Metal ratio | 3.1 |

Example 9

A mixture of 53.5 grams (0.6 mole) of 1-nitropropane, 318 grams (1.0 mole) of cetyl phenol, 953 grams of mineral oil, 40 grams of water and 342 grams (2.0 moles) of barium oxide was heated at reflux temperature for one hour. The temperature was raised to 150° C. and carbon dioxide bubbled through the mixture at this temperature until the mixture was neutral. The mixture was filtered yielding a filtrate having the following analyses:

| | |
|---|---|
| Percent sulfate ash | 25.0 |
| Percent N | 0.14 |
| Base No | 2.2 |
| Metal ratio | 2.3 |

Example 10

A solvent-extracted, Mid-Continent petroleum fraction having a viscosity of 91 SUS (210° F.) was nitrated by treatment with 1.5 moles of 70% aqueous nitric acid at 70–90° C. for 4 hours and subsequent purification as in the above examples. A mixture of 1320 grams (2.0 moles) of this nitrated petroleum fraction, 123 grams (0.6 mole) of heptyl phenol, 1484 grams of mineral oil, 192 grams of water and 756 grams (4.9 moles) of barium oxide was heated at reflux temperature for one hour. Water was removed by distillation and the temperature increased to 150° C. whereupon carbon dioxide was passed into the mixture at this temperature until the mixture was neutral. Filtration yielded a filtrate with the following analyses:

| | |
|---|---|
| Percent sulfate ash | 26.5 |
| Percent N | 0.5 |
| Base No. | 3.0 |
| Metal ratio | 3.2 |

Example 11

A Pennsylvania bright stock having a viscosity of 150 SUS (210° F.) was nitrated as in the above examples by treatment with 1.3 moles of 70% aqueous nitric acid. A mixture of 589 grams (1.0 mole) of this nitrated bright stock, 124 grams (0.6 mole) of heptyl phenol, 720 grams of mineral oil, 90 grams of water and 378 grams (4.9 moles) of barium oxide was heated at 116° C. for an hour. Water was removed by distillation and the temperature raised to 150° C. Carbon dioxide was bubbled into the mixture at this temperature until the mixture was neutral. Filtration yielded a filtrate having the following analyses:

| | |
|---|---|
| Percent sulfate ash | 27.1 |
| Percent N | 0.5 |
| Base No. | 6.0 |
| Metal ratio | 2.7 |

Example 12

A mixture of 504 grams (0.4 mole) of a nitrated polyisobutylene prepared as in Example 1, 62 grams (0.3 mole) of heptyl phenol and 646 grams of mineral oil was heated at 70° C. and then treated with 189 grams (2.5 moles) of barium oxide. The resulting mixture was heated to 100° C. and carbon dioxide bubbled into the mixture at this temperature at a rate of 3 cubic feet per hour for 3 hours. At this point the mixture was slightly basic. This mixture was filtered to yield a clear, dark red filtrate having the following analyses:

| | |
|---|---|
| Percent sulfate ash | 16.5 |
| Percent N | 0.3 |
| Base No. | 3.0 |
| Metal ratio | 2.8 |

The oil-soluble products available from the process of this invention may be used as additives for asphalt, plastic, paint, lubricant and grease compositions, and also in cutting oils. They are especially useful in the formulation of asphalt emulsions and lubricant compositions. The range of concentrations by weight within which the products of the process of this invention may be used in such formulations are as follows:

| | Percent |
|---|---|
| (a) As a wetting agent in asphalt emulsions | 0.1– 5.0 |
| (b) As a drier in paint formulations | 0.2–20.0 |
| (c) As a dispersant in lubricants | 0.2–15.0 |
| (d) As a heat and light stabilizer in plastics | 0.1– 5.0 |

Specific formulations of useful compositions containing the products of this invention are as follows:

(e) An asphalt emulsion containing 65% of asphalt, 33% of water and 2% of the product of Example 2.

(f) A plastic composition containing 40% of polyvinyl chloride having molecular weight of about 20,000, 59.3% of dioctyl phthalate and 0.7% of the product of Example 8

(g) A paint containing 98.5% of an alkyd type enamel and vehicle, and 1.5% of the product of Example 7

Other modes of applying the principle of the invention may be employed, change being made as regards the details described, provided the features stated in any of the following claims or the equivalent of such be employed.

I claim:

1. A process for the preparation of oil-soluble compositions containing stoichiometrically large amounts of metal which comprises preparing a mixture of (a) an alkyl phenol,
(b) from about 0.1 to about 5.0 equivalents per equivalent of (a) of a nitrated substantially aliphatic hydrocarbon selected from the class consisting of nitroparaffins and those prepared by treatment of a substantially aliphatic hydrocarbon with a nitrating agent at a temperature within the range of from about 50° C. to about 200° C., and
(c) at least two equivalents per equivalent of combined (a) and (b) of a basic barium compound selected from the class consisting of barium oxide and barium hydroxide; and treating the mixture with carbon dioxide at a temperature within the range of 75–250° C. to reduce the titratable basicity of said mixture to a value below 10.

2. The process of claim 1 characterized further in that the nitrated substantially aliphatic hydrocarbon of (b) is prepared by the nitration of a substantially aliphatic petroleum fraction.

3. The process of claim 1 characterized further in that the nitrated substantially aliphatic hydrocarbon of (b) is prepared by the nitration of a substantially aliphatic olefin polymer.

4. The process of claim 1 characterized further in that the nitrated substantially aliphatic hydrocarbon of (b) is prepared by the nitration of a polymer of isobutylene.

5. The process of claim 1 characterized further in that the alkyl phenol of (a) is heptyl phenol.

6. The process of claim 1 characterized further in that the basic barium compound of (c) is barium oxide.

7. A product prepared as in the process of claim 1.

8. A process for the preparation of oil-soluble compositions containing stoichiometrically large amounts of metal which comprises preparing a mixture of (a) heptyl phenol
(b) from about 0.1 to about 5.0 equivalents per equivalent of (a) of a nitrated substantially aliphatic petroleum fraction prepared by treatment of a substantially aliphatic petroleum fraction with a nitrating agent at a temperature within the range of from about 50° C. to about 200° C., and
(c) at least two equivalents per combined equivalent of combined (a) and (b) of barium oxide; and treating the mixture with carbon dioxide at a temperature within the range of 75–250° C. the titratable basicity of said mixture to a value below 10.

9. A product prepared as in the process of claim 8.

References Cited in the file of this patent

UNITED STATES PATENTS

| | | |
|---|---|---|
| 2,616,925 | Asseff et al. | Nov. 4, 1952 |
| 2,617,049 | Asseff et al. | Nov. 4, 1952 |
| 2,619,460 | Neff | Nov. 25, 1952 |
| 2,762,774 | Popkin | Sept. 11, 1956 |
| 2,852,355 | Kelly et al. | Sept. 16, 1958 |